(12) United States Patent
Maeda

(10) Patent No.: US 8,680,807 B2
(45) Date of Patent: Mar. 25, 2014

(54) MOTOR CONTROL APPARATUS AND IMAGE FORMING APPARATUS

(75) Inventor: Yoritsugu Maeda, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 12/817,054

(22) Filed: Jun. 16, 2010

(65) Prior Publication Data
US 2010/0327797 A1 Dec. 30, 2010

(30) Foreign Application Priority Data

Jun. 30, 2009 (JP) ................................. 2009-155304

(51) Int. Cl.
*H02P 1/46* (2006.01)
(52) U.S. Cl.
USPC ....... 318/721; 318/400.01; 318/811; 388/811
(58) Field of Classification Search
USPC ............ 318/721, 650, 400.01, 811, 810, 268, 318/561, 609, 812, 819; 388/811
See application file for complete search history.

(56) References Cited

U.S. PATENT DOCUMENTS

2011/0273127 A1* 11/2011 Imamura et al. .............. 318/650

FOREIGN PATENT DOCUMENTS

| JP | 07-039181 A | 2/1995 |
| JP | 2007-156238 A | 6/2007 |

* cited by examiner

*Primary Examiner* — Karen Masih
(74) *Attorney, Agent, or Firm* — Canon USA, Inc., IP Division

(57) ABSTRACT

A motor control apparatus for controlling a DC motor includes a first detection unit configured to detect an angular velocity of the DC motor, a driven member configured to be driven by the DC motor, a control unit configured to perform, during start-up of the DC motor, feed forward control for changing a control value used for controlling drive of the DC motor from a first control value corresponding to an angular velocity smaller than a target angular velocity to a second control value corresponding to the target angular velocity, and to change the feed forward control to feedback control for controlling the control value based on a detection result by the first detection unit to keep the DC motor at the target angular velocity, and a second detection unit configured to detect whether the driven member has been replaced.

9 Claims, 18 Drawing Sheets

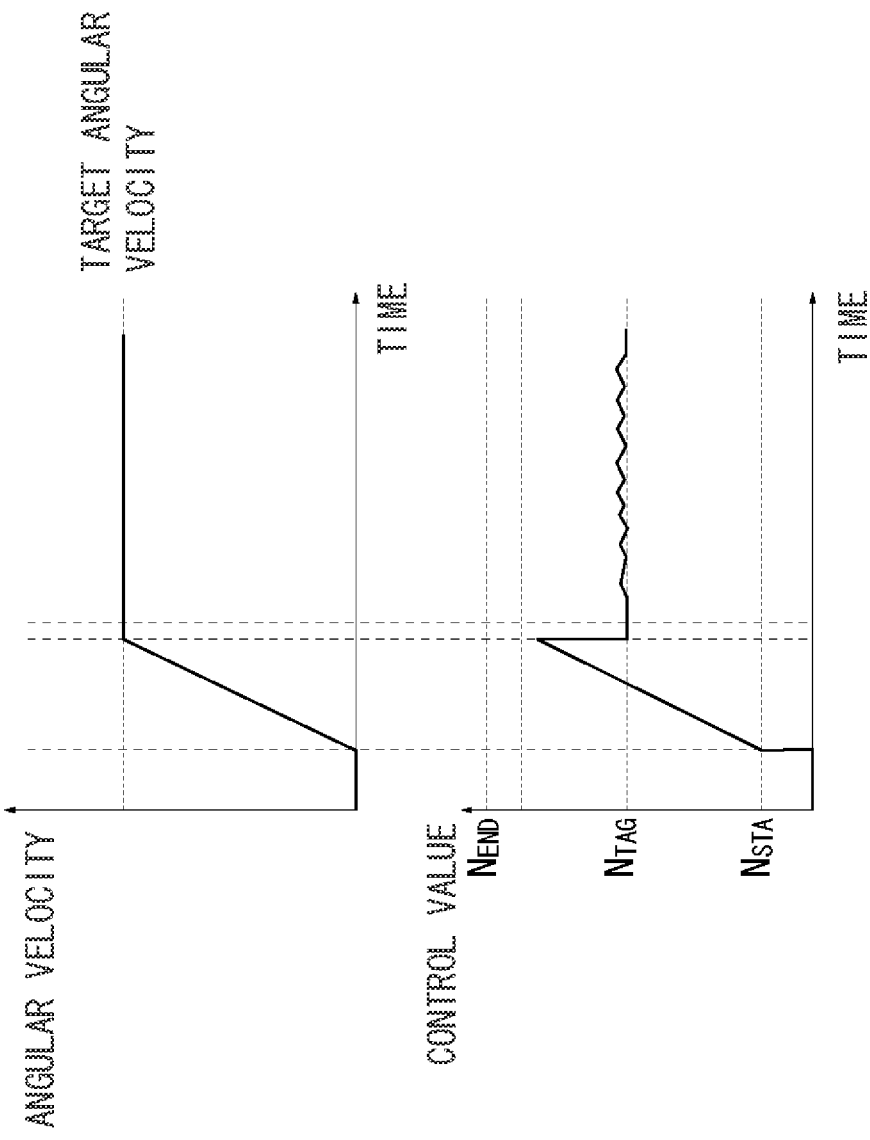

MOTOR CONTROL APPARATUS AND IMAGE FORMING APPARATUS

BACKGROUND OF THE INVENTION

1. Field of the Invention

The present invention relates to a motor control apparatus used for controlling a DC motor and an image forming apparatus including the motor control apparatus.

2. Description of the Related Art

In forming a toner image on a sheet of paper, some copying machines or printers form a toner image on a photosensitive drum, transfer the toner image onto an intermediate transfer belt, and transfer the toner image from the intermediate transfer belt onto a sheet. In order to obtain a high quality image, some of such copying machines or printers employ different motors for driving the photosensitive drum and the intermediate transfer belt. According to such a configuration, when a peripheral speed of the photosensitive drum is different from that of the intermediate transfer belt, since the photosensitive drum contacts the intermediate transfer belt at a transfer position, a surface flaw may be made on the photosensitive drum or the intermediate transfer belt.

Such a problem does not occur when the photosensitive drum and the intermediate transfer belt are driven at a controlled target speed. However, when the photosensitive drum and the intermediate transfer belt are driven by different motors (e.g., DC motors), since it is difficult to control the start-up of the motors from a standstill state until the motors obtain a target angular velocity, the motors will have different start-up characteristics (e.g., overshoot). Unless the motors have similar start-up characteristics, the photosensitive drum and the intermediate transfer belt will have different peripheral speeds at the time the motors are started.

In order to speedily start-up the DC motor with a small overshoot, Japanese Patent Application Laid-Open No. 7-039181 discusses a method for increasing a pulse width modulation (PWM) signal, which is used for increasing the speed of the motor from a low duty cycle by a predetermined rate. Further, Japanese Patent Application Laid-Open No. 2007-156238 discusses a method for controlling the clock frequency of the DC motor. When the motor is started, the clock frequency of the DC motor is controlled at a frequency lower than a target frequency. After the motor is started, the clock frequency is increased to the target frequency. However, even if the DC motor is controlled so that the control value is increased to a target control value when the DC motor is started and accelerated, although the angular velocity of the DC motor is increased linearly for some time, it shows a non-linear transition when the control value reaches near the target angular velocity.

SUMMARY OF THE INVENTION

According to an aspect of the present invention, a motor control apparatus for controlling a DC motor includes a first detection unit configured to detect an angular velocity of the DC motor, a driven member configured to be driven by the DC motor, a control unit configured to perform, during start-up of the DC motor, feed forward control for changing a control value used for controlling drive of the DC motor from a first control value corresponding to an angular velocity smaller than a target angular velocity to a second control value corresponding to the target angular velocity, and to change the feed forward control to feedback control for controlling the control value based on a detection result by the first detection unit to keep the DC motor at the target angular velocity, and a second detection unit configured to detect whether the driven member is replaced. If the second detection unit does not detect replacement of the driven member, the control unit sets a control value used in a past feedback control as the second control value, and if the second detection unit detects replacement of the driven member, the control unit sets a predetermined control value corresponding to a replaced driven member as the second control value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 15A to 15D illustrate a relation between a control value and an angular velocity according to an exemplary embodiment of the present invention.

DESCRIPTION OF THE EMBODIMENTS

Figures 16A, 16B:
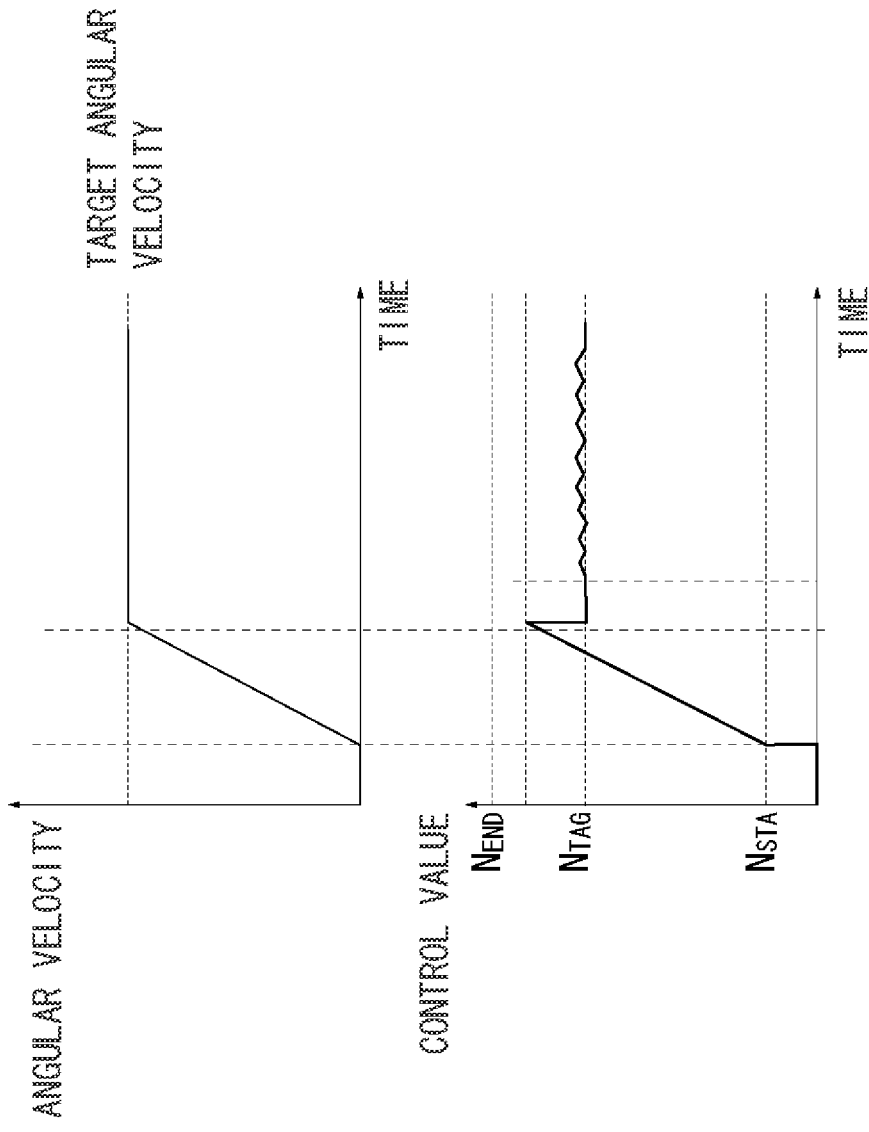
FIGS. 16A to 16D illustrate a relation between a control value and an angular velocity according to a related technique.

A method for controlling the start-up characteristic by using feed-forward control and feedback control is explained below. At the time the DC motor is started and accelerated, the feed-forward control is performed (see FIG. 16B). In other words, a control value used for controlling a PWM control signal is sent to the DC motor so that the control value is increased by a constant ratio from a first control value $N_{STA}$, which corresponds to a lower angular velocity than a target angular velocity, to a second control value $N_{END}$, which corresponds to an angular velocity higher than the target angular velocity. When the DC motor reaches the target angular velocity, the control value is switched to a control value $N_{TAG}$ so as to maintain the target angular velocity of the DC motor, and then the feedback control is started according to a result of a detection of the angular velocity of the DC motor.

In this way, the angular velocity indicates a sharp rise followed by a plateau (see FIG. 16A) when the DC motor is started. This means that the start-up characteristic of the motor can be controlled. Thus, start-up characteristics of a plurality of DC motors can be controlled to have similar characteristics, and accordingly, a peripheral speed difference between the photosensitive drum and the intermediate transfer belt can be removed.

The control value which is used after the angular velocity has reached the target angular velocity of the DC motor is the control value $N_{TAG}$. The control value $N_{TAG}$ is the value used when the DC motor is running stably at the target angular velocity last time by the feedback control (see FIG. 16B). Accordingly, the control value immediately after the control is changed to the feedback control will be appropriate for the load on the DC motor. Thus, the DC motor that has reached a predetermined angular velocity can be controlled stably according to the control value. For this reason, even if the load of the photosensitive drum and the intermediate transfer belt is changed as the cumulative number of operations of the photosensitive drum and the intermediate belt driven by the DC motor is increased, a control value that corresponds to the load can be used. As a result, the angular velocity when the control is changed to the feedback control does not fluctuate.

Figures 16C, 16D:
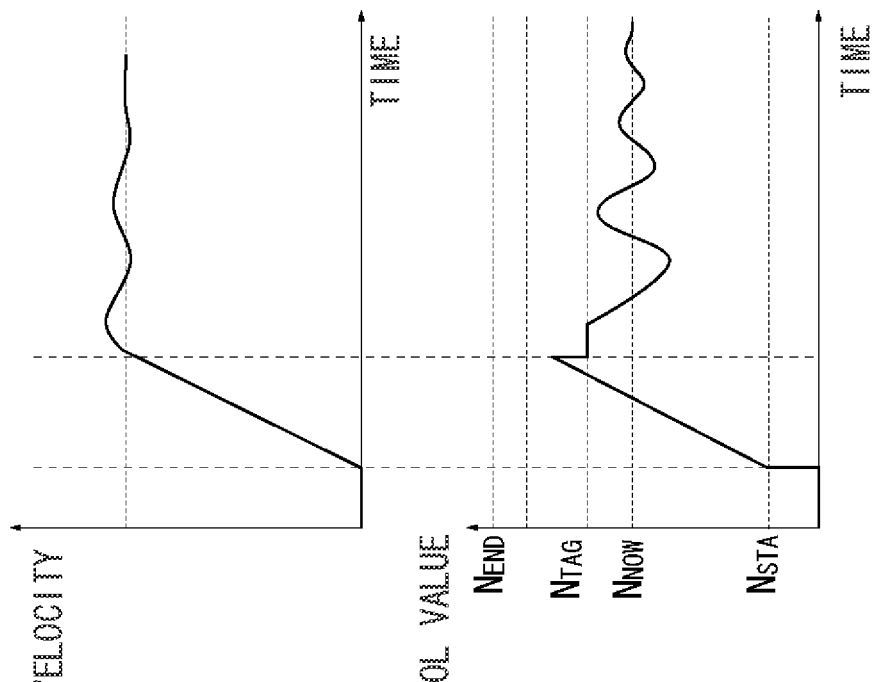

However, this method is not appropriate when the photosensitive drum or the intermediate transfer belt is replaced with a new drum or a new belt when the drum or the belt is deteriorated. This is because the load of the new drum or belt is greatly different from the load of the replaced drum or belt. In such a case, even if a control value that has been used the last time the motor has been operated is applied to the DC motor when it is started, the control value does not correspond to the actual load. Thus, when the DC motor is started after the drum or the belt is replaced, the control value $N_{TAG}$, which is the control value used when the control is changed to the feedback control, will not match the load after the replacement of the photosensitive drum or the intermediate transfer belt (see FIG. 16D). As a result, the angular velocity fluctuates (see FIG. 16C).

Various exemplary embodiments, features, and aspects of the invention will be described in detail below with reference to the drawings.

Figure 1:
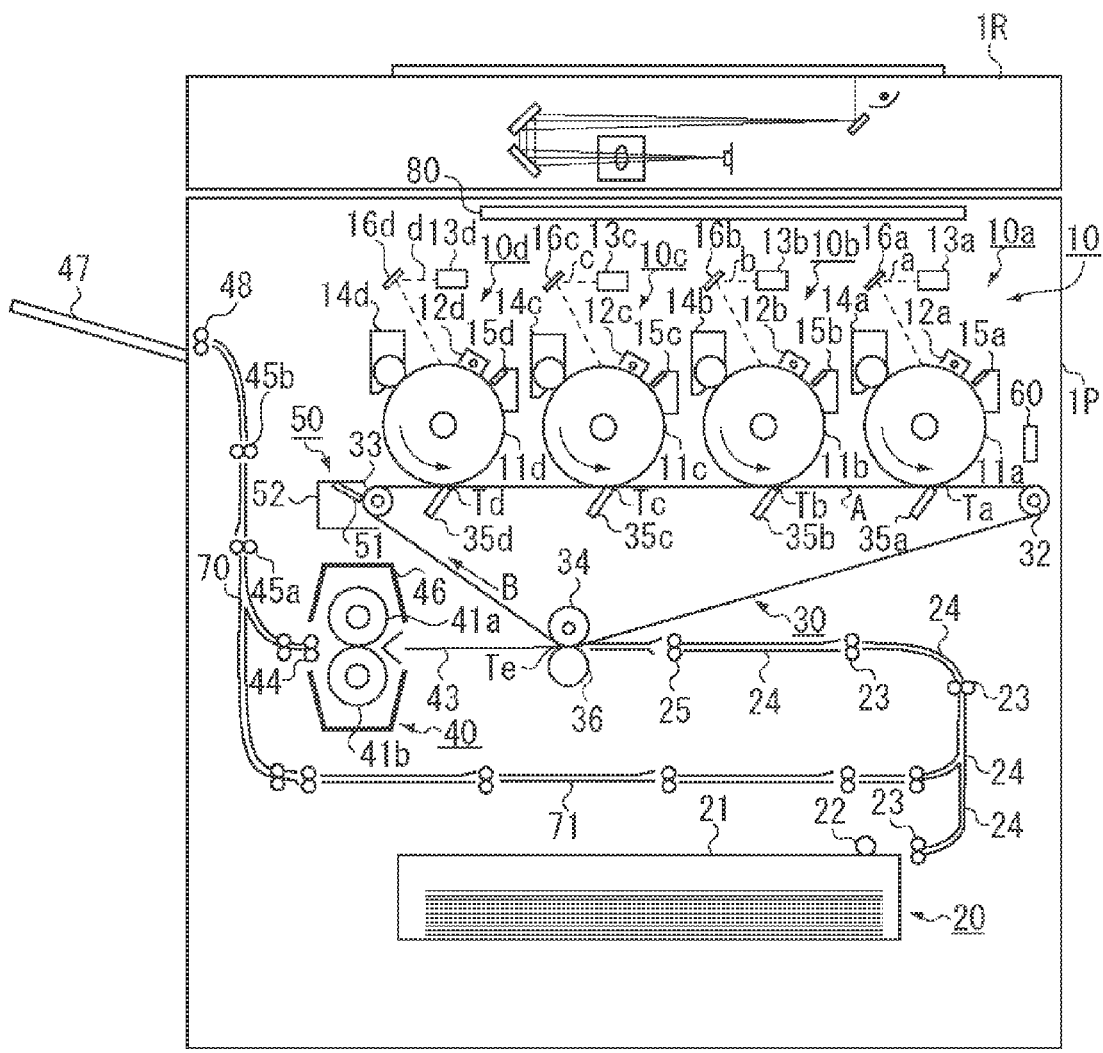
FIG. 1 is a cross section view of a color copying machine according to an exemplary embodiment of the present invention.

FIG. 1 is a cross section of an image forming apparatus according to an exemplary embodiment of the present invention. A color copying machine according to the present exemplary embodiment includes a plurality of parallelly-arranged image forming units and employs an intermediate transfer method. The color copying machine includes an image reading unit 1R and an image output unit 1P.

The image reading unit 1R optically reads a document image, converts it into an electric signal, and sends it to the image output unit 1P. The image output unit 1P includes image forming units 10 (10a, 10b, 10c, and 10d), a paper feed unit 20, an intermediate transfer unit 30, a fixing unit 40, and a cleaning unit 50.

Each of the units will now be described in detail. Each of the image forming units 10a, 10b, 10c, and 10d has a same configuration. Each of photosensitive drums 11a, 11b, 11c, and 11d, as a first image bearing member, is rotatably supported by a shaft and rotated in the direction of the arrow.

Facing the periphery of the photosensitive drums 11a to 11d and in the direction of rotation, there are provided primary charging devices 12a, 12b, 12c, and 12d, exposure units 13a, 13b, 13c, and 13d, reflective mirrors 16a, 16b, 16c, and 16d, development devices 14a, 14b, 14c, and 14d, and cleaning devices 15a, 15b, 15c, and 15d.

Each of the primary charging devices 12a to 12d provides a uniform amount of charge on the surface of each of the photosensitive drums 11a to 11d. According to a recording image signal sent from the image reading unit 1R, each of the exposure units 13a to 13d forms an electrostatic latent image on each of the corresponding photosensitive drums 11a to 11d. In forming the electrostatic latent image, each of the exposure units 13a to 13d directs laser beams on the photosensitive drums 11a to 11d via the reflective mirrors 16a to 16d.

Further, the electrostatic latent image formed on each of the photosensitive drums 11a to 11d is made visible by the development devices 14a to 14d, each of which contains developer (toner) of one out of four colors (yellow, cyan, magenta, and black). The visible images (toner images) are transferred onto an intermediate transfer belt 31 as a second image bearing member of the intermediate transfer unit 30 at each of image transfer positions Ta, Tb, Tc, and Td.

The cleaning devices 15a, 15b, 15c, and 15d, which are provided downstream of the image transfer positions Ta, Tb, Tc, and Td, scrape the toner remaining on the photosensitive drums 11a to 11d untransferred onto the intermediate transfer belt 31 and clean the drum surface. According to the processes described above, image formation using the toner is sequentially performed.

The feed unit 20 includes a cassette 21 that contains print paper P, a pick up roller 22 used for picking up the print paper P from the cassette 21 one by one, and paper feed roller pairs 23 used for feeding the print paper P picked up by the pick up roller 22. Further, the feed unit 20 includes a paper feed guide 24 and a registration roller pair 25 used for conveying the print paper P to the secondary transfer position Te at appropriate timing with respect to the image on the intermediate transfer belt 31.

Next, the intermediate transfer unit 30 will be described in detail. The intermediate transfer belt 31 is supported by a drive roller 32 that transmits the drive to the intermediate transfer belt 31, a driven roller 33 that rotates according to the rotation of the intermediate transfer belt 31, and a secondary transfer counter roller 34. Further, a primary transfer plane A is formed between the drive roller 32 and the driven roller 33. The drive roller 32 is driven by a motor (not shown).

At the back side of the intermediate transfer belt 31 at the primary transfer positions Ta to Td where the photosensitive drums 11a to 11d face the intermediate transfer belt 31, there are arranged primary transfer charging devices 35a to 35d. On the other hand, a secondary transfer roller 36 is arranged opposite the secondary transfer counter roller 34. The secondary transfer position Te is formed at a nip portion of the intermediate transfer belt 31 and the secondary transfer roller 36. The secondary transfer roller 36 is pressed against the intermediate transfer belt 31 with a moderate pressure.

Further, the cleaning unit 50 which cleans the image forming side of the intermediate transfer belt 31 is provided downstream of the secondary transfer position Te of the intermediate transfer belt 31. The cleaning unit 50 includes a cleaning blade 51 used for removing residual toner on the intermediate transfer belt 31 and a waste toner box 52 used for storing the waste toner collected by the cleaning blade 51.

The fixing unit 40 includes a fixing roller 41a including a heat source such as a halogen heater, and a fixing roller 41b pressed against the fixing roller 41a. Further, the fixing unit 40 includes a conveyance guide 43 that guides the print paper P to a nip portion of the fixing rollers 41a and 41b and a heat insulating cover 46 that traps in the heat generated by the fixing unit. Furthermore, the fixing unit 40 includes a discharge roller 44, vertical path rollers 45a and 45b, and a discharge roller 48, all of which are used for conveying the print paper P discharged from the fixing rollers 41a and 41b to the outside of the apparatus, and also a discharge tray 47 used for loading the discharged print paper P.

Next, the operation of the color copying machine having the above-described configuration will be described. When an image forming start signal is issued by a CPU, a paper feeding operation is started from the cassette 21. For example, in a case where paper is fed from the cassette 21, first, the print paper P is picked up one by one from the cassette 21 by the pick up roller 22. Then, the print paper P is conveyed through the paper feed guide 24 to the registration roller pair 25 by the paper feed roller pairs 23. At that time, since the registration roller pair 25 is not rotating, the leading edge of the print paper P contacts a nip portion of the registration roller pair 25.

After then, the registration roller pair 25 starts rotating according to an image formed on the intermediate transfer belt 31. This rotation starts at such timing that the toner image on the intermediate transfer belt 31 can be transferred onto the print paper P at the secondary transfer position Te.

At the image forming unit, when the image forming start signal is issued, a toner image formed on the photosensitive drum 11d is primary transferred onto the intermediate transfer belt 31 by the primary transfer charging device 35d at the primary transfer position Td. The primary transferred toner image is then conveyed to the primary transfer position Tc. At the primary transfer position Tc, image formation is performed after a time lag that equals the time that is necessary in conveying the toner image to the next image forming unit. After positional alignment, a toner image is transferred on the image that has already been transferred. Similar processing is performed at the next image forming unit. Consequently, a toner image of four colors is primary transferred onto the intermediate transfer belt 31.

After then, the print paper P enters the secondary transfer position Te and contacts the intermediate transfer belt 31. When the print paper P passes the secondary transfer position Te, a high voltage is applied to the secondary transfer roller 36. According to the processing described above, the toner image of four colors formed on the intermediate transfer belt 31 is transferred onto the print paper P. After then, the print paper P is conveyed to the nip portion of the fixing rollers 41a and 41b by the conveyance guide 43. Then, according to the heat and nip pressure at the fixing rollers 41a and 41b, the toner image is fixed onto the print paper P. Then, the print paper P is conveyed by the discharge roller 44, the vertical path rollers 45a and 45b, and the discharge roller 48 and discharged from the apparatus. Then, the print paper P is loaded on the discharge tray 47.

Figure 2:
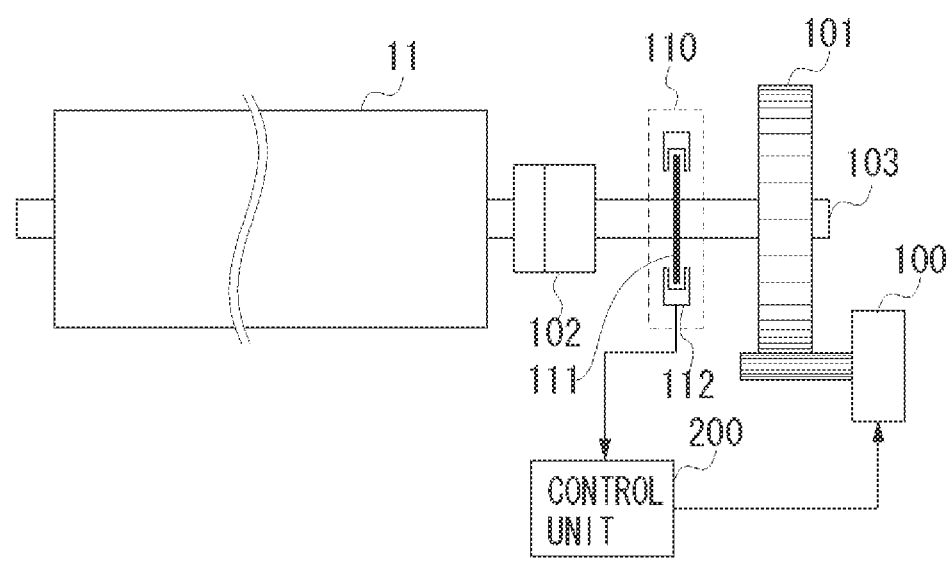
FIG. 2 illustrates a drive configuration of a photosensitive drum.

Next, the drive of the photosensitive drum 11 by a motor control apparatus included in the image forming apparatus will be described referring to FIG. 2. According to the present embodiment, a motor 100, such as a DC brushless motor, is provided for each of the photosensitive drums 11a to 11d as a driven member. The motor 100 is controlled by a control unit 200. The driving force of the motor 100 is transmitted to the photosensitive drums 11 via a gear 101, a drive shaft 103, and a coupling 102. The photosensitive drum 11 rotates with this driving force.

An encoder wheel 111 is fixed to the drive shaft 103. The encoder wheel 111 rotates at the same angular velocity as that of the drive shaft 103. An encoder 110 includes the encoder wheel 111 and an encoder sensor 112. The encoder wheel 111 is a transparent disk having evenly spaced printed black lines that fan out to the edge of the disk.

The encoder sensor 112 includes a light-emitting portion and a light-receiving portion with the encoder wheel 111 in between. When the black portion of the disk comes to the position of the light-receiving portion, the light directed to the light-receiving unit is blocked. On the other hand, when the transparent portion of the disk comes to the position of the light-receiving portion, the light is incident on the light-receiving unit. The encoder sensor 112 generates a signal according to whether the light is incident on the light-receiving portion. In this manner, the encoder 110 sends a cycle signal based on the angular velocity of the drive shaft 103 to the control unit 200. Then, the control unit 200 controls the motor 100 according to the signal sent from the encoder 110.

Figure 3:
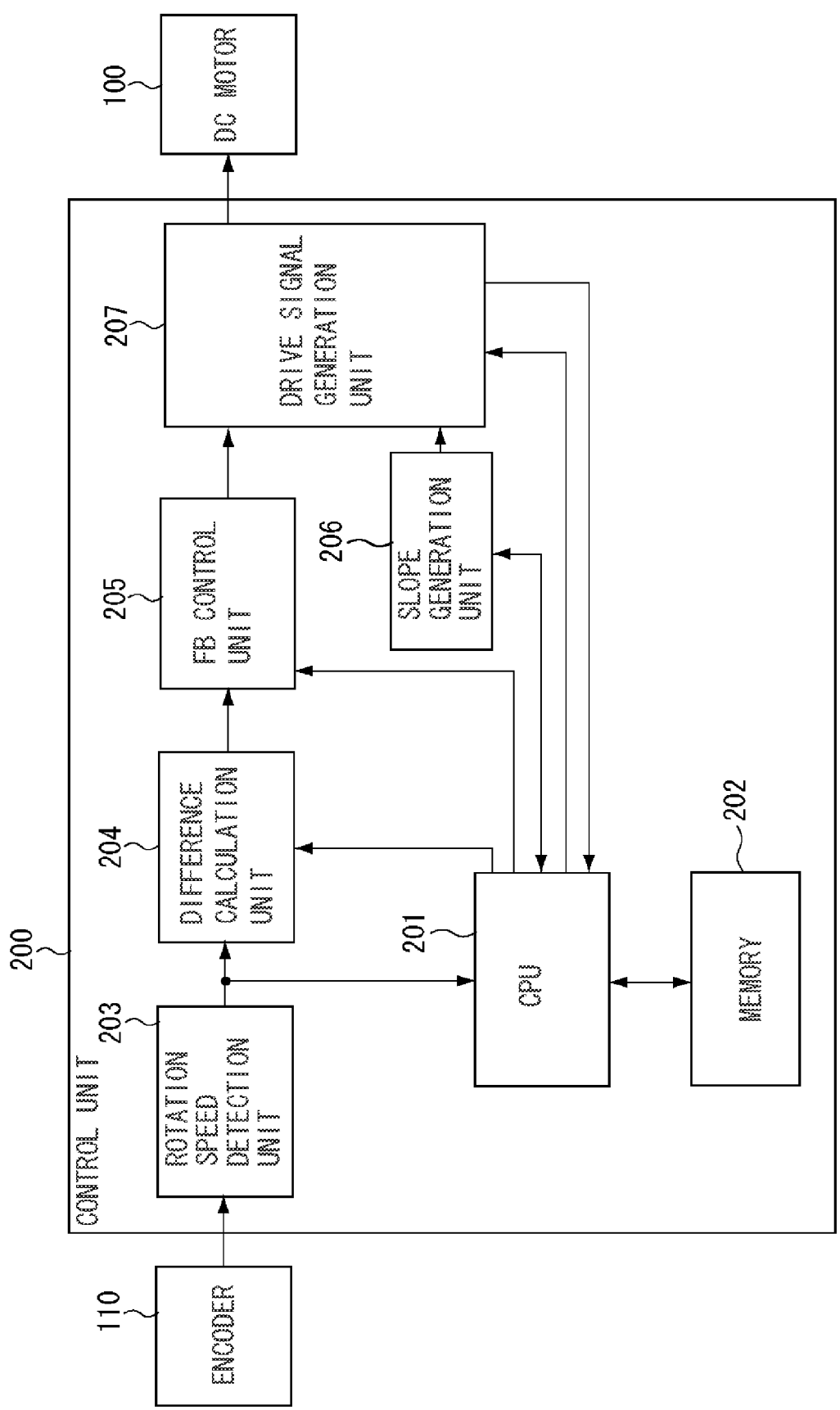
FIG. 3 is a block diagram of a control unit used for controlling a motor.
Figure 4:
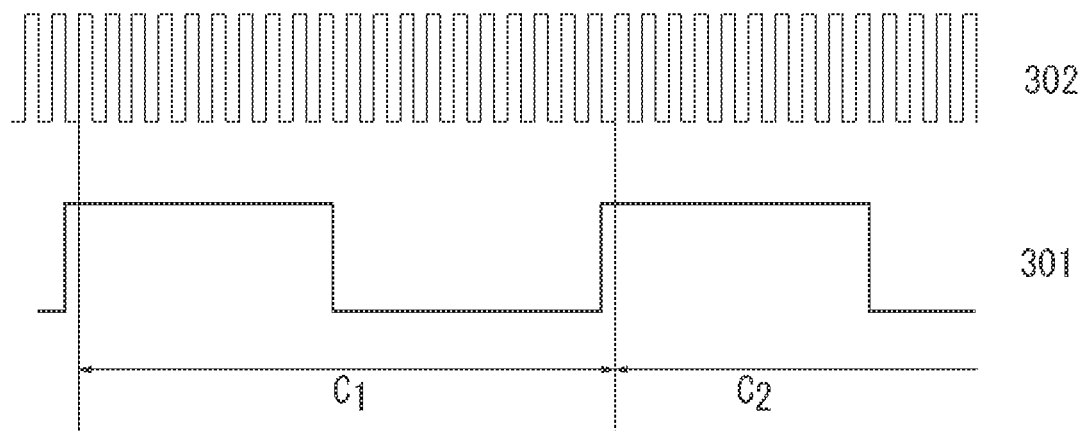
FIG. 4 illustrates detection performed by a rotation speed detection unit.

FIG. 3 is a block diagram of the control unit 200. A rotation speed detection unit 203 (a first detection unit) detects a cycle of a pulse signal sent from the encoder 110. The rotation speed detection unit 203 detects the cycle of a pulse signal 301 by counting the number of pulses of a clock 302 in one cycle of the pulse signal 301 (C1: from the rise of the pulse signal 301 to the next rise) illustrated in FIG. 4. The clock 302 is a pulse signal of a constant cycle shorter than the cycle of the pulse signal 301. The clock 302 is generated by, for example, a crystal oscillator, and input into the rotation speed detection unit 203.

Figure 5A:
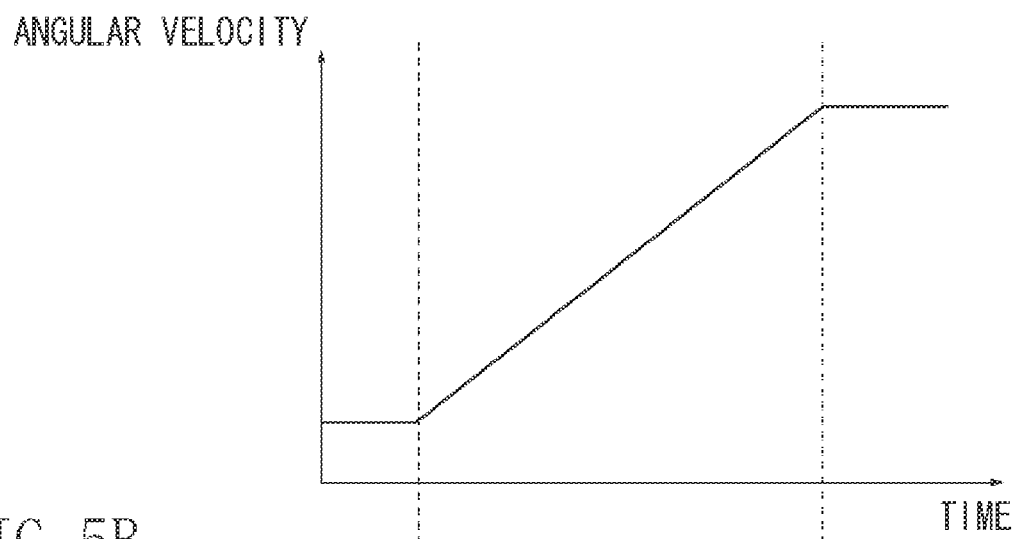
FIGS. 5A and 5B illustrate a relation between a count number and an angular velocity of a rotation speed detection unit.
Figure 5B:
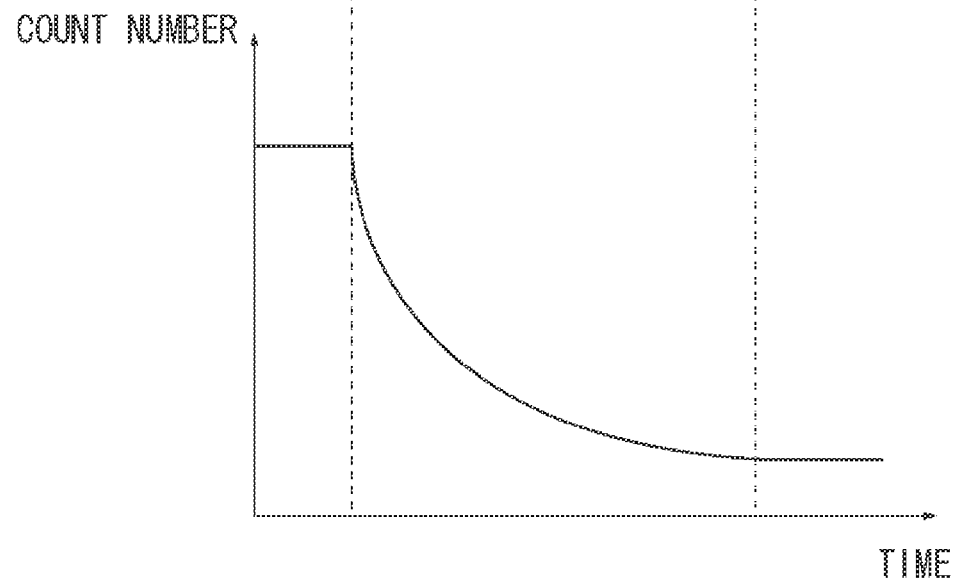

The rotation speed detection unit 203 calculates the angular velocity from the detected pulse width. FIG. 5A illustrates the change in the angular velocity of the drive shaft 103 when the motor 100 is started. FIG. 5B illustrates the count number (pulse cycle) counted by the rotation speed detection unit 203 when the motor 100 is started. As can be seen from FIG. 5B, the angular velocity is inversely proportional to the count number. Thus, the angular velocity can be calculated according to equation (1). A coefficient K is an arbitrary coefficient.

$$\text{Angular velocity} = K/(\text{count number}) \quad (1)$$

A difference calculation unit 204 calculates a difference between the detected angular velocity output from the rotation speed detection unit 203 and a target angular velocity supplied from a CPU 201. An FB control unit 205 calculates a correction control value, which is used to rotate the drive shaft 103 at the target angular velocity. The correction control value is calculated according to the difference value output from the difference calculation unit 204 and feedback gain values ($K_P$, $T_I$, and $T_D$) supplied from the CPU 201.

A drive signal generation unit 207 generates a PWM control signal of a duty ratio corresponding to a control value obtained by adding a correction control value output from the FB control unit 205 and a target control value $N_{TAG}$ output from the CPU 201, or a control value output from a slope generation unit 206. The PWM control signal is a signal used for performing PWM (pulse width modulation) control of the motor 100. The slope generation unit 206 outputs a control value that is increased by a constant ratio with the passage of time.

When the motor 100 is rotated at a constant angular velocity, a control value obtained by adding the correction control value output from the FB control unit 205 and the target control value $N_{TAG}$ output from the CPU 201 is used. Further, when the motor 100 is started, the control value output from the slope generation unit 206 is used.

Figure 6:
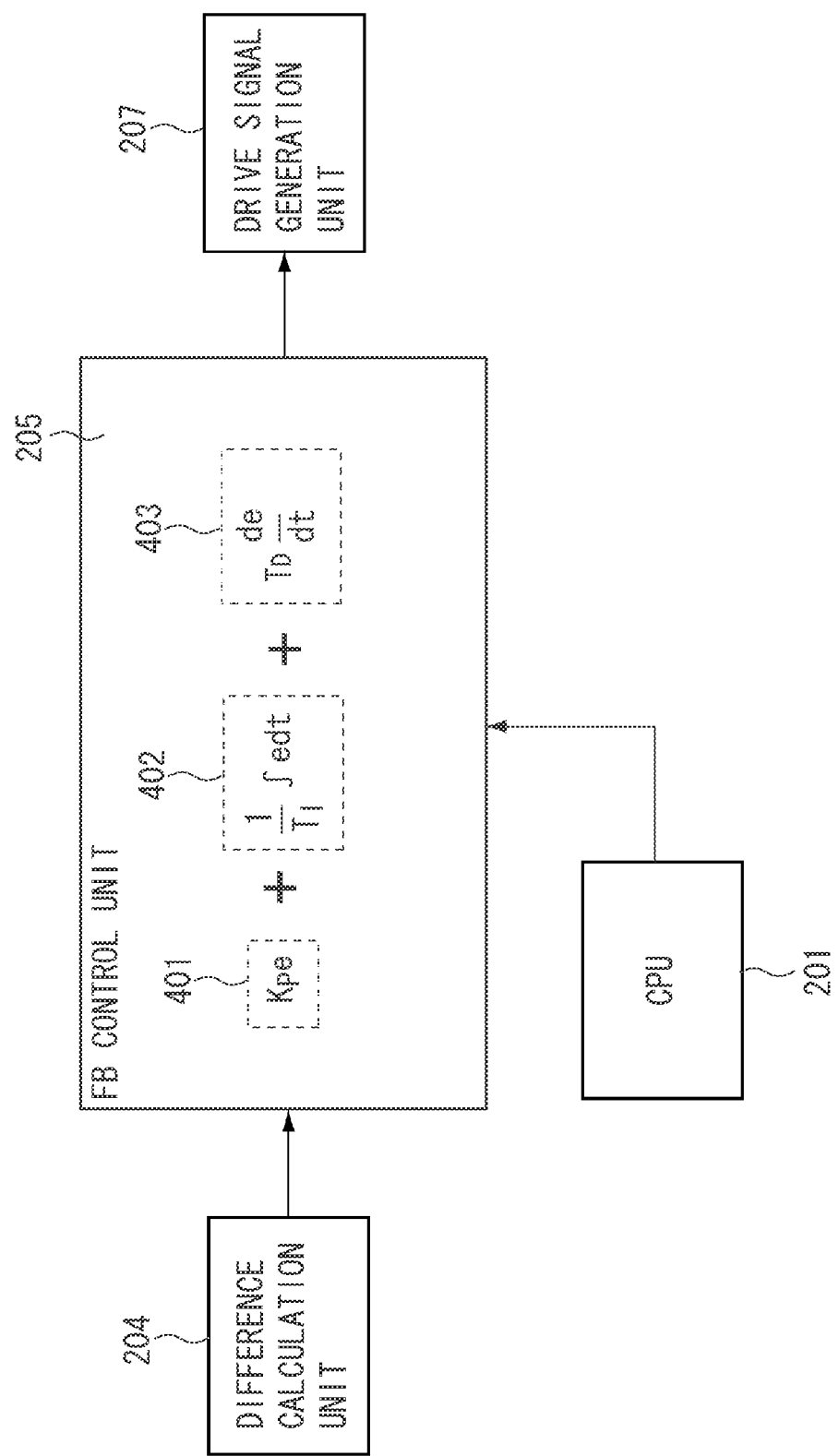
FIG. 6 illustrates processing performed by a feedback (FB) control unit.

FIG. 6 illustrates processing performed by the FB control unit 205. The FB control unit 205 performs proportional-integral-derivative (PID) control according to a difference value "e" output from the difference calculation unit 204. A control value for the PID control is calculated according to the following equation (2).

$$K_P e + \frac{1}{T_I} \int e\, dt + T_D \frac{de}{dt} \qquad (2)$$

Values $K_P$, $T_I$, and $T_D$ are feed back gain values of a proportional term 401, an integral term 402, and a derivative term 403 of the PID control, and determined by the CPU 201 according to the angular velocity of the drive shaft 103.

Figure 7A:
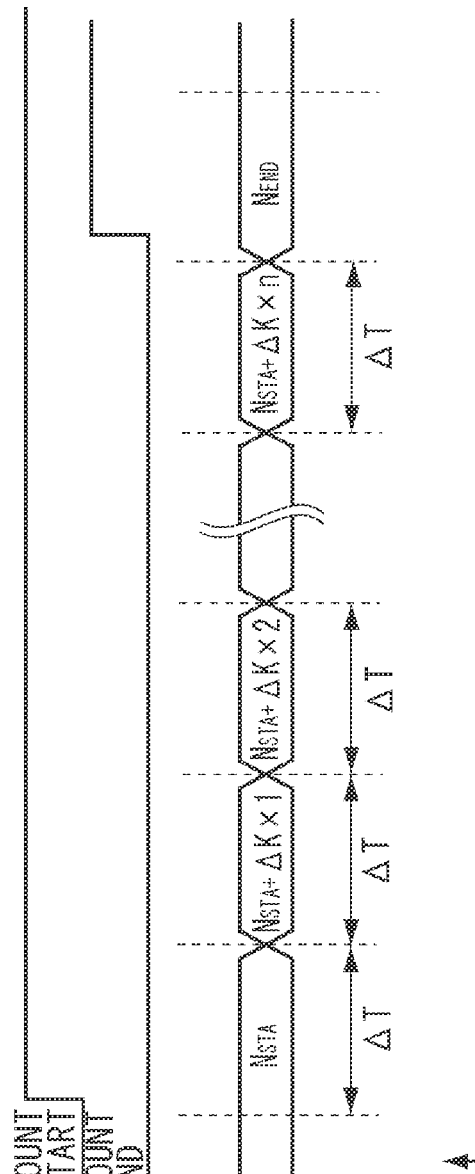
FIGS. 7A and 7B illustrate processing performed by a slope generation unit.
Figure 7B:
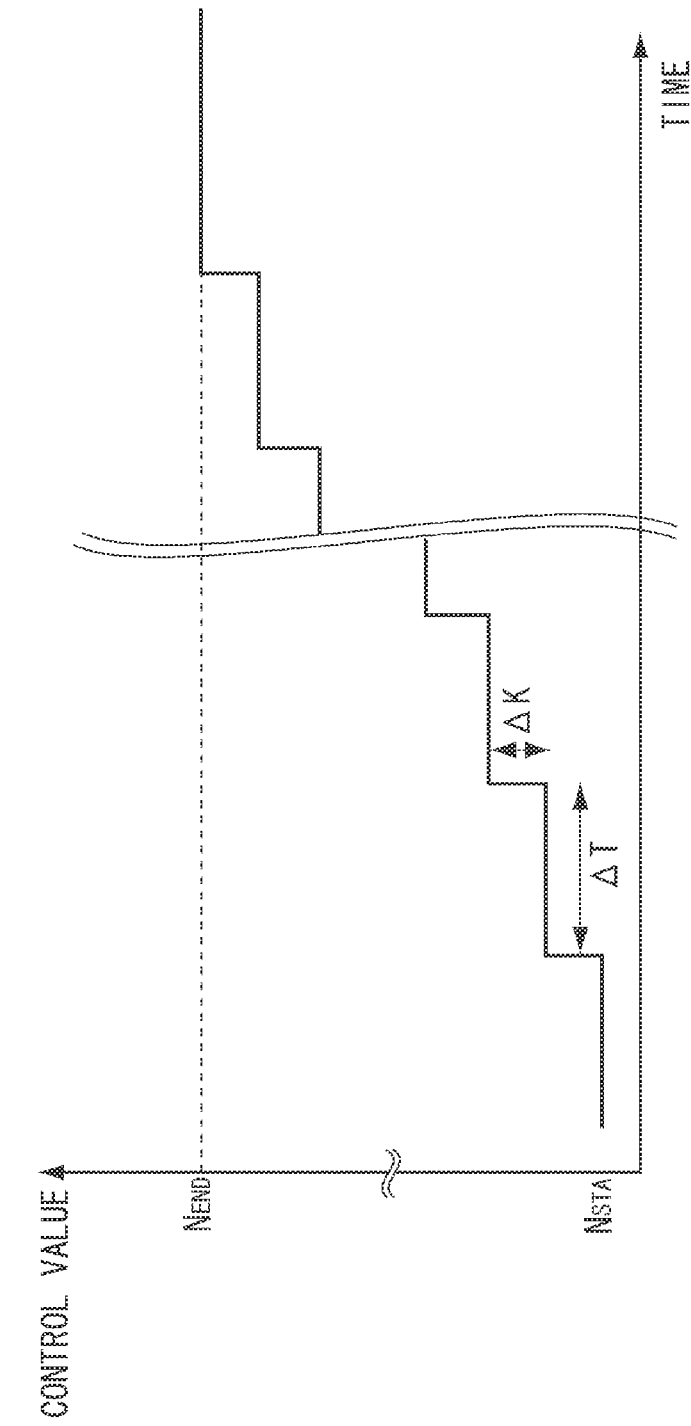

FIGS. 7A and 7B illustrate processing performed by the slope generation unit 206. The slope generation unit 206 generates a control value (speed command value) that is linearly increased by a constant ratio with the passage of time. As illustrated in FIGS. 7A and 7B, when the slope generation unit 206 performs acceleration control, the slope generation unit 206 increments an initial control value $N_{STA}$ (a first control value) by a predetermined amount ΔK for every predetermined time ΔT to a maximum control value $N_{END}$ (a third control value) according to a count start signal sent from the CPU 201, and outputs the obtained result as a control value.

Before sending the count start signal to the slope generation unit 206, the CPU 201 sets the initial control value $N_{STA}$ and the maximum control value $N_{END}$ in the slope generation unit 206. When the control value reaches the maximum control value $N_{END}$, the slope generation unit 206 sends a count end signal to the CPU 201 and stops the increment.

When a control value that is linearly increased by a constant ratio is sent from the slope generation unit 206, the drive signal generation unit 207 outputs a PWM control signal whose duty ratio is linearly increased by a constant ratio to the motor 100.

Figure 8A:
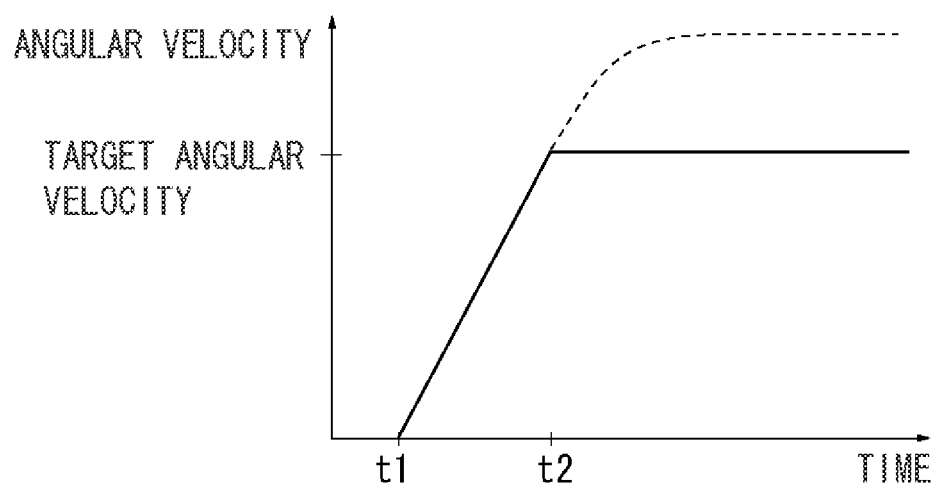
FIGS. 8A and 8B illustrate a relation between a control value and an angular velocity.
Figure 8B:
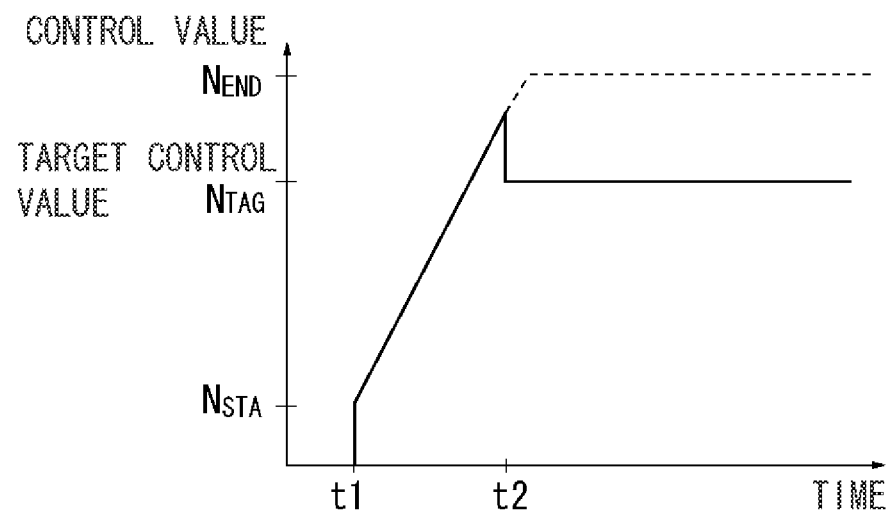

As can be seen from time t1 to t2 in FIG. 8A, the angular velocity of the motor 100 is linearly increased following the control value that is linearly increased as can be seen from time t1 to t2 in FIG. 8B. However, the angular velocity of the motor 100 at the time of acceleration responds to the PWM control signal (duty ratio is linearly increased) at delayed timing. Thus, the angular velocity of the motor 100 does not coincide with the angular velocity indicated by the PWM control signal. For this reason, if the control value is changed so that the change indicates a sharp rise followed by a plateau as is shown by the dotted line in FIG. 8B, since the feedback control for obtaining an angular velocity that corresponds to the control value is performed after the increase of the control value is stopped, the start-up characteristics of the angular velocity of the motor 100 will be nonlinear as is shown by the dotted line in FIG. 8A.

Thus, the CPU 201 sets the maximum control value $N_{END}$ to such a value that the angular velocity of the motor 100 is linearly increased as illustrated in FIG. 8A until at least it reaches the target angular velocity. In other words, the CPU 201 sets the maximum control value $N_{END}$ to a value that is a predetermined percentage higher than the target control value $N_{TAG}$ so that the angular velocity of the motor 100 reaches the target angular velocity before the control value that is increased reaches the maximum control value $N_{END}$. According to the present embodiment, the CPU 201 sets the maximum control value $N_{END}$ as a control value used for obtaining an angular velocity 10% higher than the target angular velocity.

In this way, the control value used for the motor 100 is linearly increased from the first control value, which corresponds to an angular velocity smaller than the target angular velocity, to the third control value, which corresponds to an angular velocity greater than the target angular velocity, by a constant ratio. In other words, the feed forward control is performed with respect to the control value used for the motor 100 so that the control value is linearly increased from the first control value, which corresponds to an angular velocity smaller than the target angular velocity, to the third control value, which corresponds to an angular velocity greater than the target angular velocity.

Until the angular velocity of the motor 100 reaches the target angular velocity (time t2 in FIG. 8A), the CPU 201 accelerates the motor 100 according to the control value output from the slope generation unit 206 as can be seen from time t1 to t2 in FIG. 8B. When the angular velocity of the motor 100 reaches the target angular velocity (time t2 in FIG. 8A), the target control value $N_{TAG}$ (the second control value) is used for controlling the angular velocity, as indicated by the solid line from time t2 in FIG. 8B, so that the motor 100 runs at the target angular velocity. Then, the motor 100 is controlled so that the motor 100 runs at the target angular velocity.

In other words, when the angular velocity of the motor 100 reaches the target angular velocity, the control value used for running the motor 100 is changed to the target control value $N_{TAG}$. Then, a control value according to the detection result of the rotation speed detection unit 203 is used for the motor 100. In other words, when the angular velocity of the motor 100 reaches the target angular velocity, the feed forward control is performed so that the control value is temporarily changed to the target control value $N_{TAG}$. After then, the feedback control is performed, and a control value according to the result of the detection performed by the rotation speed detection unit 203 is used for running the motor 100.

The predetermined time ΔT and the predetermined amount ΔK are determined according to the performance, torque load, and inertia of the motor 100. For example, if a load of 30 m Nm and inertia of 400 g cm2 (including motor) is coupled to a motor with a rated output of 15 W, the predetermined time ΔT and the predetermined amount ΔK are preferably set to values that allow acceleration of the speed of the motor 100 from 0 to 2000 rpm in approximately 300 ms. Further, the initial control value $N_{STA}$ is preferably at a level by which the motor 100 can be started. According to the present embodiment, the duty ratio of the PWM control signal is approximately 10% to 20%.

Figure 9:
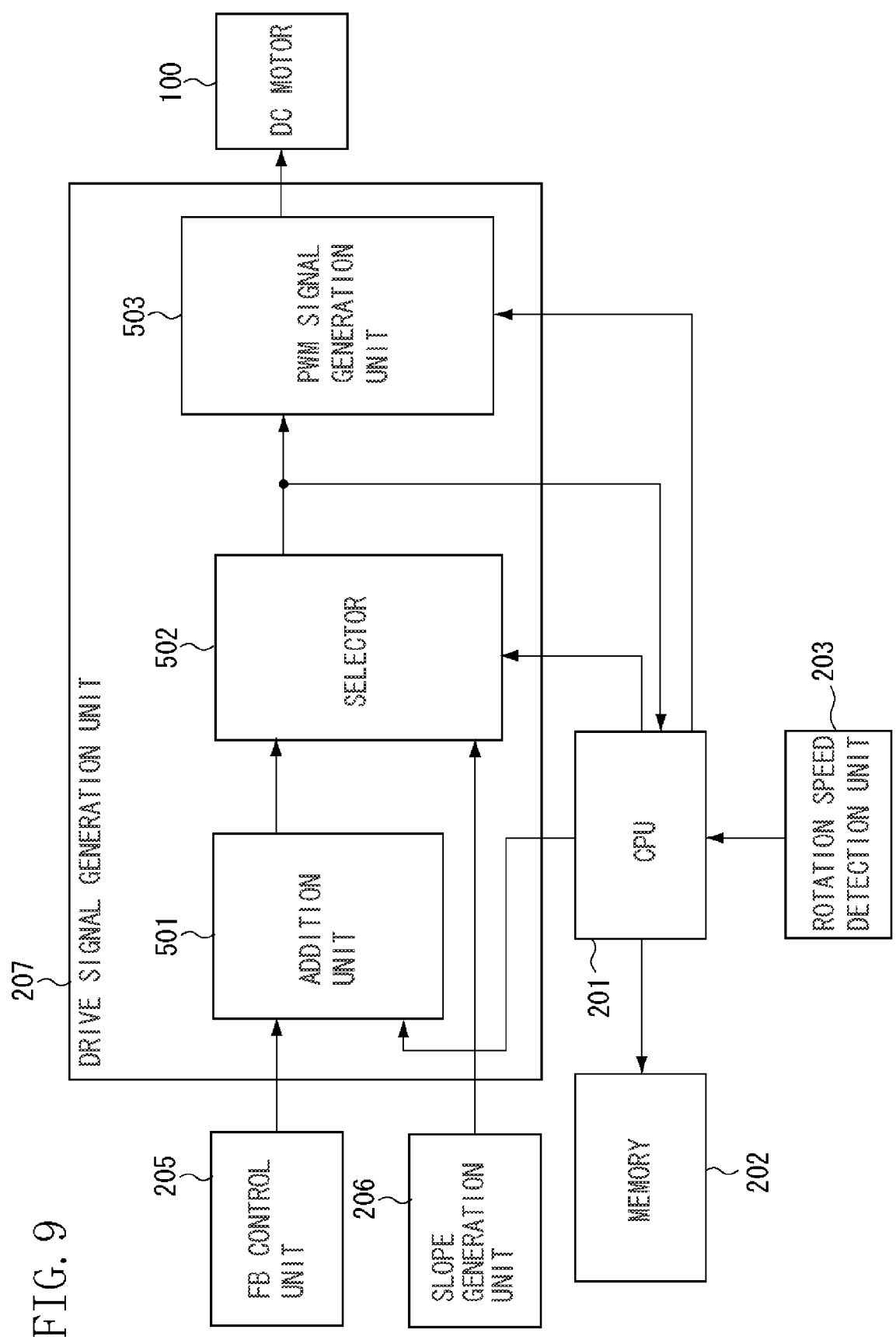
FIG. 9 is a block diagram illustrating a configuration of a drive signal generation unit.

FIG. 9 is a block configuration of the drive signal generation unit 207.

The control value output from the FB control unit 205 and the control value $N_{TAG}$ used for directing the target angular velocity output from the CPU 201 are added by an addition unit 501. The control value added by the addition unit 501 and the control value generated by the slope generation unit 206 are input into a selector 502. The selector 502 selects either a control value output from the slope generation unit 206 or a control value output from the addition unit 501 according to a signal sent from the CPU 201. When the motor 100 is accelerated, the CPU 201 instructs the selector 502 to select the control value output from the slope generation unit 206 until the rotation speed detection unit 203 determines that the motor 100 has reached the target angular velocity. When the motor 100 has reached the target angular velocity, the CPU 201 instructs the selector 502 to select the control value output from the addition unit 501.

A PWM signal generation unit 503 generates a PWM control signal according to a control value selected by the selector 502 and information of the PWM frequency sent from the CPU 201, and supplies it to the motor 100. Further, the CPU 201 averages the control values (PWM duty) while the selector 502 is selecting the control value from the addition unit 501 (while the feedback control is being performed by the FB control unit 205), and stores the obtained average control value in a memory 202. Then, when the motor 100 is started the next time, the CPU 201 inputs the average control value stored into the memory 202 in the addition unit 501. When the motor 100 is started, the CPU 201 inputs the average control value of the last time the motor has been operated into the addition unit 501. The target control value input in the addition unit 501 is the target control value $N_{TAG}$.

Figure 10:
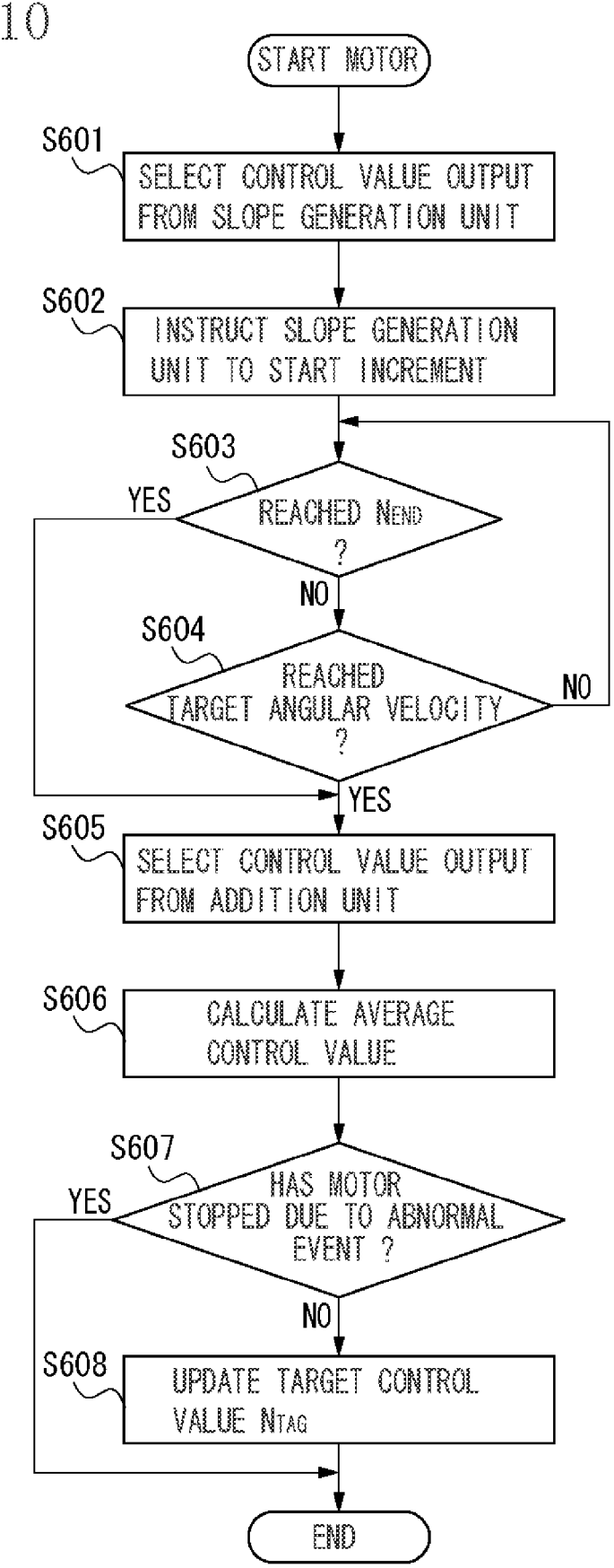
FIG. 10 is a flowchart illustrating operations performed by a CPU when the motor is started.

FIG. 10 is a flowchart illustrating processing executed by the CPU 201 during start-up of the motor 100.

In step S601, the CPU 201 instructs the selector 502 of the drive signal generation unit 207 to select a control value from the slope generation unit 206. In step S602, the CPU 201 instructs the slope generation unit 206 to start the increment from the initial control value $N_{STA}$ to the maximum control value $N_{END}$ according to a count start signal. The control value incremented by the slope generation unit 206 is sent to the selector 502.

In step S603, while the slope generation unit 206 performs incrementing, the CPU 201 monitors the slope generation unit 206 and determines whether the incremented control value has reached the maximum control value $N_{END}$. The CPU 201 makes the determination by monitoring whether a count end signal has been output from the slope generation unit 206. If the CPU 201 determines that the control value has not yet reached the maximum control value $N_{END}$ (NO in step S603), the processing proceeds to step S604. In step S604, the CPU 201 determines whether the angular velocity of the motor 100 has reached the target angular velocity according to the result of the detection obtained by the rotation speed detection unit 203. If the CPU 201 determines that the angular velocity has not yet reached the target angular velocity (NO in step S604), then the processing returns to step S603. If the CPU 201 determines that the angular velocity has reached the target angular velocity (YES in step S604), the processing proceeds to step S605. In step S605, the CPU 201 instructs the selector 502 of the drive signal generation unit 207 to select a control value from the addition unit 501.

As described above, the target angular velocity is input into the difference calculation unit 204 and the target control value $N_{TAG}$ is input into the addition unit 501 by the CPU 201. Furthermore, as described below, when the control is changed from the feed forward control to the feedback control, since the FB control unit 205 is reset, the difference stored in the FB control unit 205 is also reset. Thus, the control value obtained from the addition unit 501 will be a control value used for maintaining the target angular velocity. In step S603, if the CPU 201 determines that the control value has reached the maximum control value $N_{END}$ (YES in step S603), the processing proceeds to step S605.

In step S606, after the selector 502 selects a signal from the addition unit 501, the CPU 201 acquires control values output from the addition unit 501, and calculates the average control value. In step S607, the CPU 201 determines whether the motor 100 has stopped due to an abnormal event. If the CPU 201 determines that the motor 100 has not stopped due to an abnormal event (NO in step S607), the processing proceeds to step S608. In step S608, the CPU 201 replaces the target control value $N_{TAG}$ stored in the memory 202 with the average control value calculated in step S606.

Further, if the CPU 201 determines that the motor 100 has stopped due to an abnormal event (YES in step S607), the CPU 201 does not update the target control value $N_{TAG}$. The abnormal event in this case is where an excessive load is applied to the motor 100 and the angular velocity of the motor 100 is out of the target angular velocity by a predetermined amount (e.g., about ±7%) for a predetermined period of time (e.g., one second or more), or a signal is not entered by the encoder 110 for a predetermined period of time (e.g., 100 ms). The calculation of the average control value performed in step S606 is continued while the feedback control of the motor 100 is being performed.

Further, while the selector 502 is selecting a control value generated by the slope generation unit 206, the CPU 201 continues the reset operation of the FB control unit 205 (continues outputting a reset signal to the FB control unit 205). When the selector 502 changes the control value to the control value obtained from the FB control unit 205 (the addition unit 501), the CPU 201 cancels the reset operation of the FB control unit 205.

The timing the reset operation is cancelled is directly after the feedback control is started or a predetermined period of time (e.g., 50 ms) after the feedback control has been started. If the reset operation is cancelled a predetermined period of time after the feedback control is started, the control is performed according to the proportional 401 from the time the feedback control has been started to the time the reset operation is cancelled. Thus, an extremely small difference concerning the target control value $N_{TAG}$ can be complemented.

According to the above-described processing, when the motor 100 is started, the angular velocity of the motor 100 can be started so that it rises sharply and then flattens out as illustrated in FIG. 8A. By applying this control to the motor 100 that drives the photosensitive drum 11 and the motor that drives the drive roller 32 that rotates the intermediate transfer belt 31, the angular velocity of each motor will be able to have a sharp rise followed by a plateau. If either the motor of the photosensitive drum 11 or the motor of the intermediate transfer belt 31 is a stepping motor, the DC motor can be started so that its angular velocity has a sharp rise followed by a plateau according to the above-described control, and the stepping motor can also be started so that its angular velocity has a sharp rise followed by a plateau according to a known control operation. In this manner, the peripheral speed difference between the photosensitive drum 11 and the intermediate transfer belt 31 can be removed, and a slip between the photosensitive drum and the intermediate transfer belt at the primary transfer unit can be prevented. This contributes to preventing surface flaw on the photosensitive drum or the intermediate transfer belt.

Figure 11:
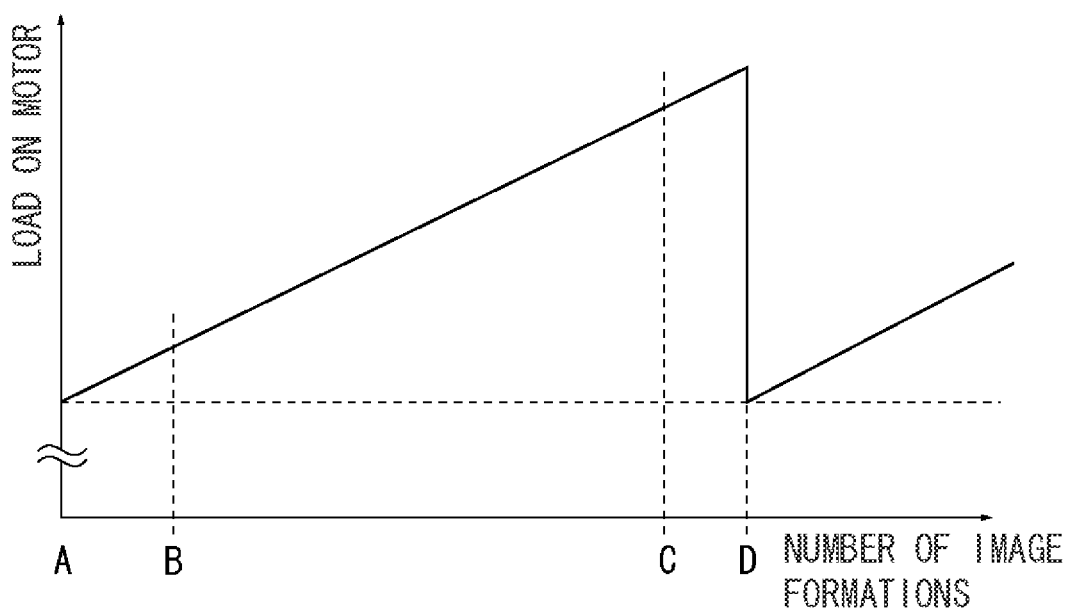
FIG. 11 illustrates a load on the motor with respect to a cumulative number of image formations.

Next, the change of the load on the motor 100 will be described. FIG. 11 illustrates a load on the motor 100 that drives the photosensitive drum 11 with respect to a cumulative number of image formations of the image forming apparatus. As illustrated in FIG. 11, the load of the photosensitive drum 11 is smallest when the number of image formations is A or D. The load is gradually increased as the cumulative number of image formations is increased. The number of image formations A and D illustrated in FIG. 11 are the cumulative number of image formations when the photosensitive drum 11 is new. The load of the photosensitive drum 11 greatly changes before and after the number of image formations D, in other words, before and after the photosensitive drum 11 is replaced with a new drum.

Figure 12A:
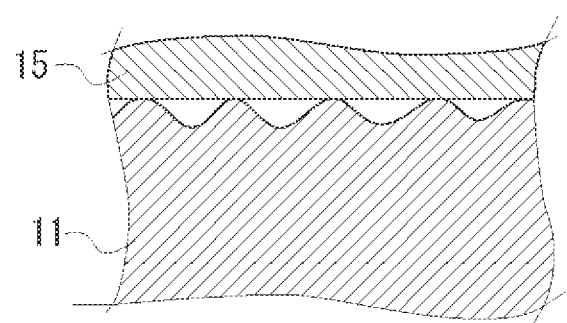
FIGS. 12A and 12B are enlarged views of a contact portion between the photosensitive drum and a cleaning device.
Figure 12B:
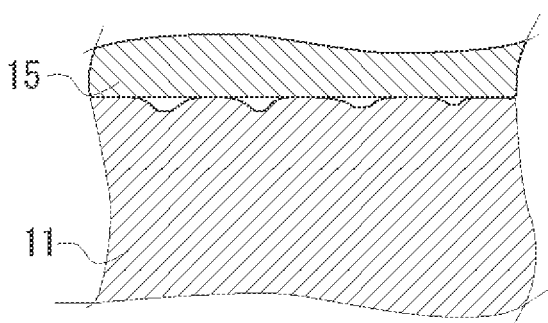

Now the reason why the load of the photosensitive drum 11 is increased with the increase in the cumulative number of image formations will be described. FIGS. 12A and 12B are enlarged views of a portion of the photosensitive drum 11 which the cleaning device 15 contacts.

When the photosensitive drum 11 is new or close to new (e.g., in the state of cumulative number of image formations B in FIG. 11), the surface of the photosensitive drum 11 is rough as illustrated in FIG. 12A. However, when the toner-removing operation for removing the toner from the surface of the photosensitive drum 11 is repeated by the cleaning device 15, the surface of the photosensitive drum 11 is gradually worn out.

FIG. 12B illustrates a surface state of the photosensitive drum 11 in the state of cumulative number of image formations C in FIG. 11. When the surface of the photosensitive drum 11 is scraped, the contact area between the photosensitive drum 11 and the cleaning device 15 is increased, and accordingly, the friction between the two is increased. Thus, in accordance with the increase in the cumulative number of image formations, the load of the photosensitive drum 11 is increased. Accordingly, the load on the motor 100 is also increased.

As described above, as the cumulative number of image formations of the photosensitive drum 11 is increased, the load of the photosensitive drum 11 is also increased gradually. When the photosensitive drum 11 is degraded and replaced with a new drum, the load of the new photosensitive drum 11 is greatly reduced. If the load of the photosensitive drum 11 gradually changes, by using the target control value $N_{TAG}$ as the average control value of the last time the motor has been operated, the target control value $N_{TAG}$ will be a value corresponding to the change in the load of the photosensitive drum 11.

However, if the load of the photosensitive drum 11 changes greatly, even if the average control value of the last time the motor has been operated is used as the target control value $N_{TAG}$, the target control value $N_{TAG}$ cannot be regarded as the control value that corresponds to the change in the load of the photosensitive drum 11. Thus, when the photosensitive drum 11 is replaced with a new drum, the target control value $N_{TAG}$ is not used as the average control value of the last time the motor has been operated and a predetermined control value (corresponding to the load of the new photosensitive drum 11) will be used.

Figure 13:
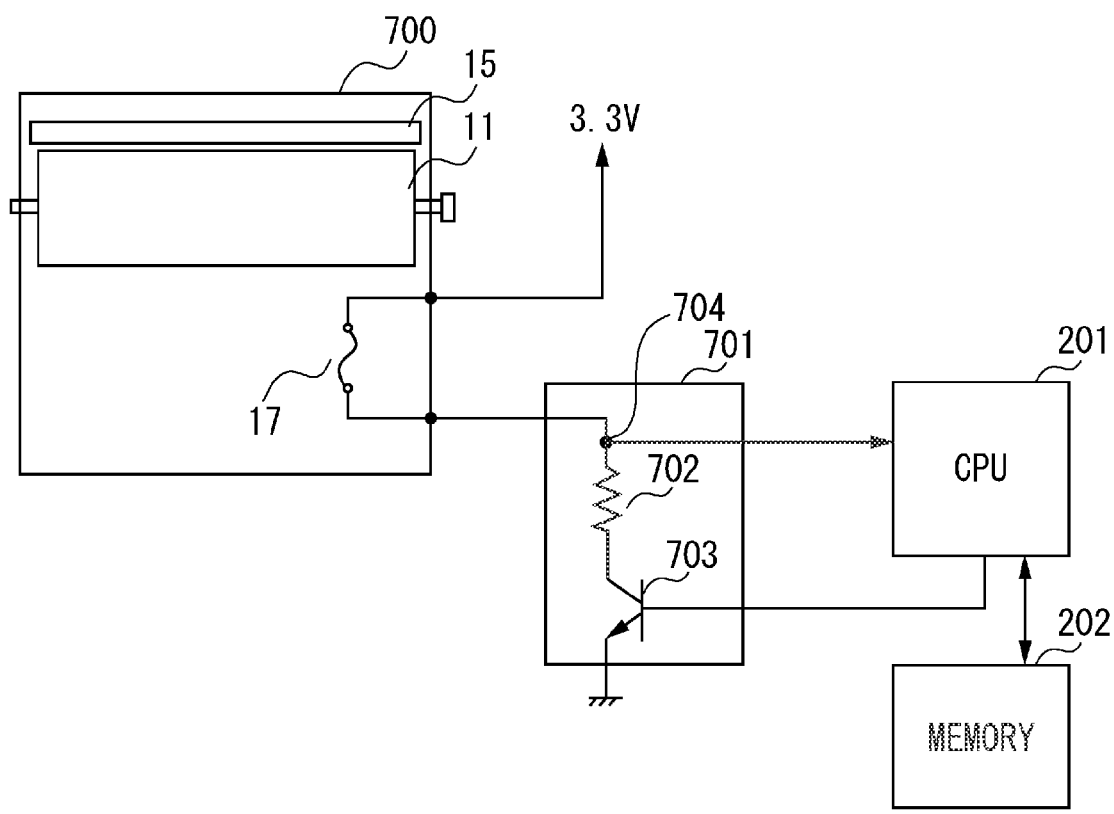
FIG. 13 is a block diagram illustrating a configuration of a new photosensitive drum detection circuit.

FIG. 13 is a block diagram of a circuitry for determining whether the photosensitive drum 11 has been replaced with a new drum.

A drum unit 700 includes the photosensitive drum 11, the cleaning device 15, and a fuse 17. The drum unit 700 is removable from the image forming apparatus 10. A new drum unit 700 includes a fuse 17 that is not fused. When the drum unit 700 is set in the image forming apparatus 10, the fuse 17 is connected to a new drum determination circuit 701 (a second detection unit). The new drum determination circuit 701 includes a resistor 702 and a transistor 703. When the drum unit 700 is set in the image forming apparatus 10, the fuse 17, the resistor 702, and the collector and the emitter of the transistor 703 are serially connected. Then, a voltage of 3.3 V is applied.

The resistor 702 is used for limiting the current and the transistor 703 is used for determining whether to supply the current to the fuse 17. The CPU 201 detects a contact voltage 704 of the fuse 17 and the resistor 702 as well as controls ON/OFF of the transistor 703. Since the resistor 702 is for limiting the current when the fuse 17 is fused, a resistance of about 10Ω is preferable. Further, the fuse 17 is preferably fused at about 100 mA. The photosensitive drum 11 is replaced by a service person when the photosensitive drum 11 makes a predetermined number of image formations (e.g., 50 thousand images) or the thickness of the surface film of the photosensitive drum 11 is reduced to a level thinner than a predetermined thickness.

Figure 14:
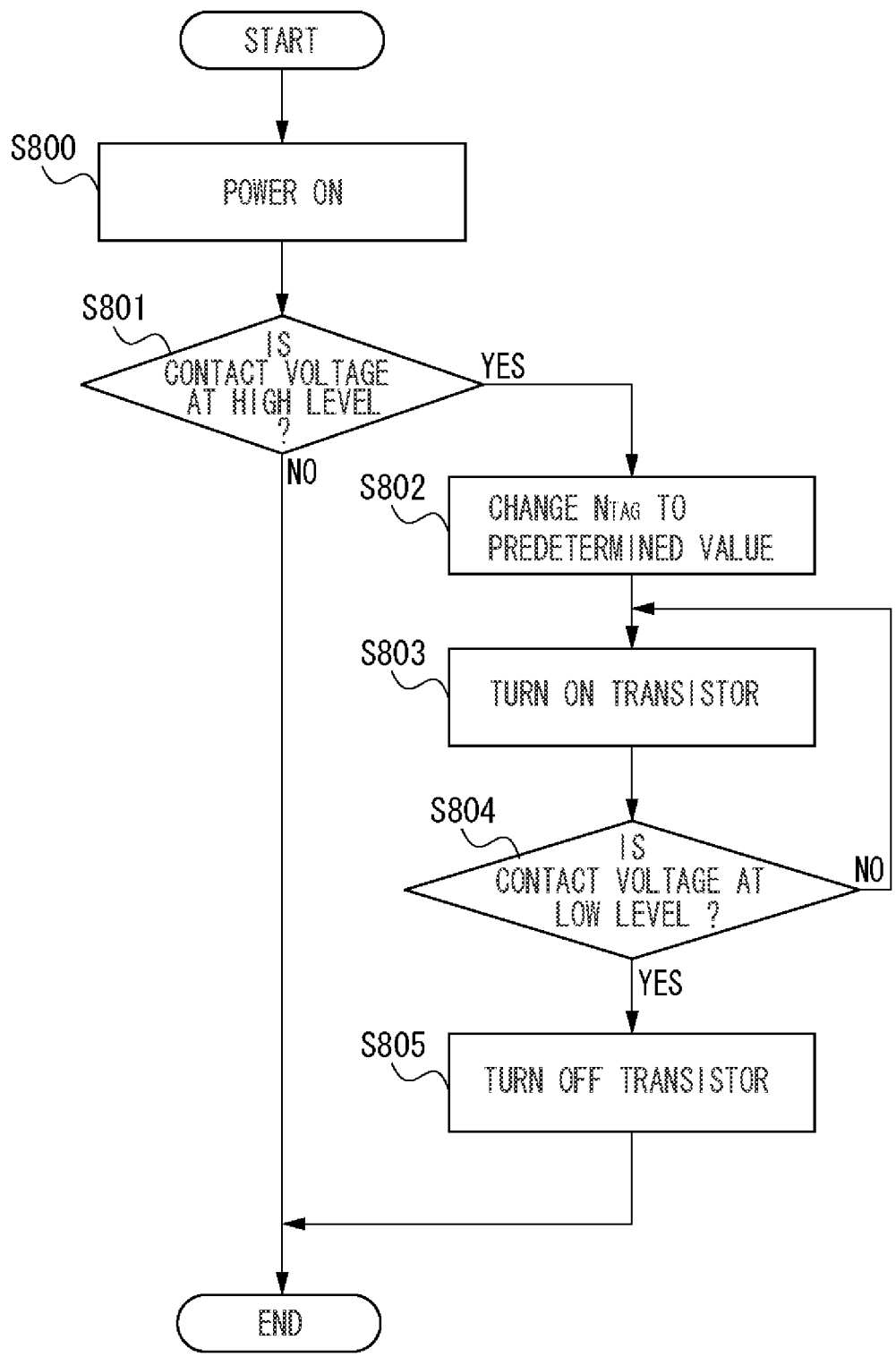
FIG. 14 is a flowchart illustrating detection of a new photosensitive drum.

FIG. 14 is a flowchart illustrating detection of a new photosensitive drum 11 executed by the CPU 201.

In step S800, the power of the image forming apparatus is turned on. In step S801, the CPU 201 determines whether the contact voltage 704 is greater than or equal to a threshold voltage, in other words, at high level. If the contact voltage 704 is at high level, in other words, if the fuse 17 is not yet fused (YES in step S801), the processing proceeds to step S802. In step S802, the CPU 201 sets the target control value $N_{TAG}$ to a predetermined value. The predetermined value is a target control value corresponding to a load (torque) of the new photosensitive drum 11 (appropriate for driving the photosensitive drum after replacement). The predetermined value is stored in advance in the memory 202.

In step S803, the CPU 201 turns on the transistor 703 and fuses the fuse 17. In step S804, the CPU 201 determines whether the contact voltage 704 is lower than the threshold voltage, in other words, at low level. If the contact voltage 704 is not at low level (NO in step S804), the processing returns to step S803, and the transistor 703 is continuously turned on. If the fuse 17 is fused and the CPU 201 determines that the contact voltage 704 is at low level (YES in step S804), the processing proceeds to step S805. In step S805, the CPU 201 turns off the transistor 703, and the processing of the new drum detection ends.

Although whether the photosensitive drum is replaced with a new drum has been detected according to the description above, the present invention is not limited to such detection. For example, whether the photosensitive drum has been replaced may be detected regardless of whether the replacement drum is a new drum or not. In this case, a control value that corresponds to the load of the replacement photosensitive drum can be used as the target control value. A memory used for storing the control value that corresponds to the load of the photosensitive drum can be provided for the photosensitive drum. Then, when the photosensitive drum is replaced, the control value can be read out from the memory of the replaced photosensitive drum.

Figures 15A, 15B:
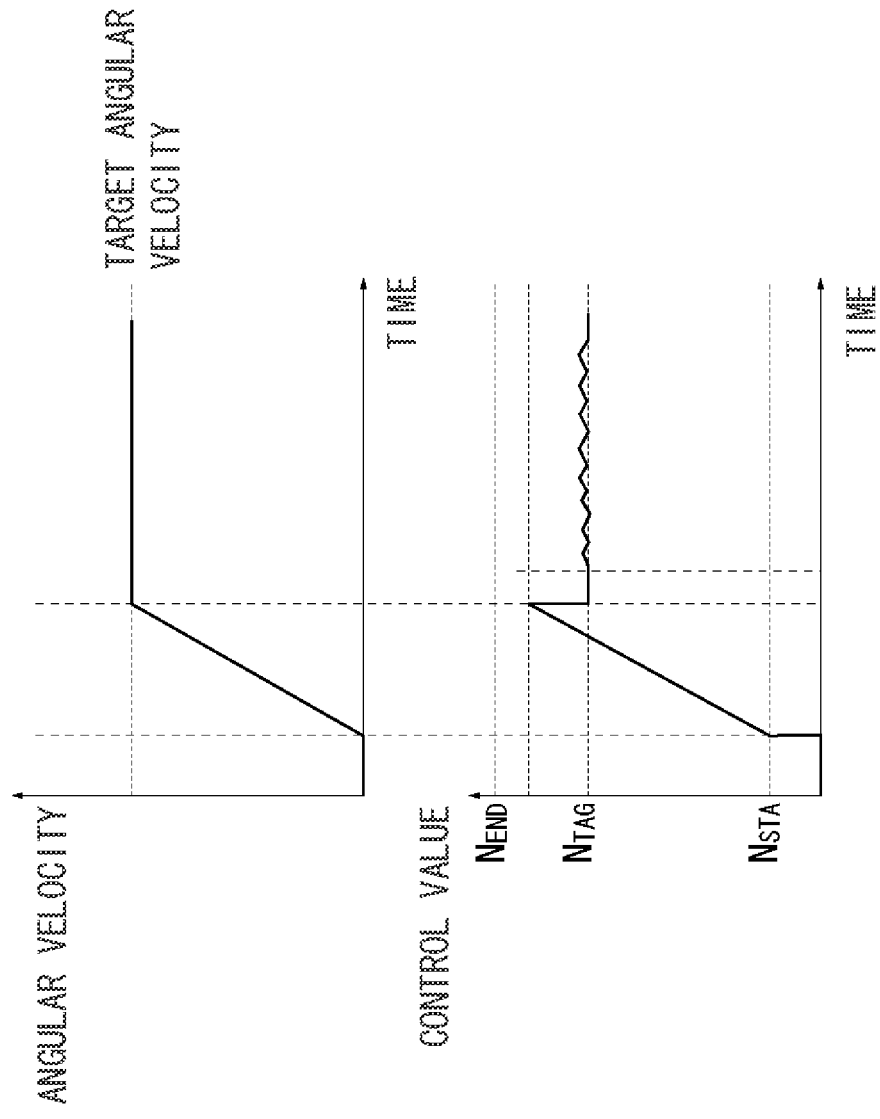

As described above, if the photosensitive drum 11 is not replaced with a new drum, by setting the average control value of the last time the motor has been operated as the target control value $N_{TAG}$, the target control value $N_{TAG}$ will correspond to the load of the present photosensitive drum 11 (see FIG. 15B), and a stable motor start-up can be realized (see FIG. 15A). In other words, although the load of the photosensitive drum 11 is increased according to the increase in the accumulated number of operations of the photosensitive drum 11, the CPU 201 can use a control value appropriate for the load. Accordingly, the angular velocity of the motor 100 does not fluctuate after the feed forward control, which is used at the time of start-up, is changed to the feedback control.

On the other hand, as described above, if the photosensitive drum 11 is replaced with a new drum, instead of using the average control value of the last time the motor has been operated, a control value (see FIG. 15D) corresponding to the load of the new photosensitive drum 11 is used as the target control value $N_{TAG}$. Accordingly, a stable start-up can be achieved (see FIG. 15C). In other words, since the control value $N_{TAG}$ which is used when the angular velocity reaches the target angular velocity corresponds to the load of the photosensitive drum 11 after the replacement, the angular velocity of the motor 100 does not fluctuate when the feed forward control, which is used at the time of start-up, is changed to the feedback control. Thus, stable start-up is possible even directly after the photosensitive drum 11 is replaced.

Although the photosensitive drum 11 is driven by a DC motor according to the present exemplary embodiment, the control of the present exemplary embodiment can also be applied to a DC motor for driving a driven member which is to be replaced with a new member. For example, similar control can be performed when a DC motor drives the drive roller 32 that transmits drive to the intermediate transfer belt 31.

Further, although whether the photosensitive drum 11 is a new drum is detected by using a fuse according to the present embodiment, a memory can be provided in the drum unit 700 and whether the drum is new or old can be stored in the memory. By reading out the information, whether the drum is new or old can be detected.

Further, according to the present embodiment, the target control value $N_{TAG}$, which is set if the photosensitive drum 11 is a new drum, is stored in the memory 202. However, by providing a memory in the drum unit 700, the control value can be stored in that memory. In this manner, a target control value corresponding to the difference of each photosensitive drum 11 can be set. Accordingly, start-up control that is furthermore stable can be achieved.

Further, according to the present embodiment, the average control value of the last time the motor has been operated is stored in the memory 202. However, a memory can be provided in the drum unit 700, and the average control value can be stored in that memory. Then, the average control value can be read out from the memory when the motor is started the next time. In this manner, stable start-up control can be achieved even if the drum unit 700 is removed from the image forming apparatus and used in a different apparatus.

Further, according to the present embodiment, if the photosensitive drum 11 is not a new drum, the average control value of the last time the motor 100 has been operated is used as the target control value $N_{TAG}$. However, a control value directly before the motor 100 has been stopped the last time can also be used as the target control value $N_{TAG}$. In other words, a control value used in the past feedback control can be used as the target control value $N_{TAG}$.

Further, according to the present embodiment, although the angular velocity of the motor 100 is detected by the encoder 110 provided on the drive shaft 103, the angular velocity can be detected according to a frequency generator (FG) signal output from the motor 100. Further, the above-described processing can be performed by detecting a peripheral speed of the photosensitive drum 11 or the intermediate transfer belt 31 and by using the result of the detection.

Furthermore, although the motor 100 is controlled by the PWM control using a control value according to the present embodiment, the motor 100 can also be controlled using a voltage according to the control value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155304 filed Jun. 30, 2009, which is hereby incorporated by reference herein in its entirety.

What is claimed is:

1. A motor control apparatus for controlling a DC motor, the motor control apparatus comprising:
    a first detection unit configured to detect an angular velocity of the DC motor;
    a driven member configured to be driven by the DC motor;
    a control unit configured to perform, during start-up of the DC motor, feed forward control for changing a control value used for controlling drive of the DC motor from a first control value corresponding to an angular velocity lower than a target angular velocity to a second control value corresponding to an angular velocity higher than the target angular velocity, and to change the feed forward control to feedback control to keep the DC motor at the target angular velocity; and
    a second detection unit configured to detect whether the driven member is replaced,
    wherein the feedback control generates the control value based on a third control value obtained from a result of the detection by the first detection unit and the target angular velocity, and a fourth control value, and
    wherein if the second detection unit does not detect replacement of the driven member, the fourth control value is set based on the control value generated by the feedback control performed in a previous driving of the DC motor, and if the second detection unit detects replacement of the driven member, a predetermined control value corresponding to a replaced driven member is set as the fourth control value.

2. The motor control apparatus according to claim 1, wherein if the second detection unit does not detect replacement of the driven member, the fourth control value is an average value of the control values generated by the feedback control performed in the previous driving of the DC motor.

3. The motor control apparatus according to claim 1, wherein the second detection unit detects that the driven member is replaced with a new member.

4. The motor control apparatus according to claim 1, wherein the control value used for controlling drive of the DC motor is a speed command value.

5. The motor control apparatus according to claim 1 further comprising a signal generation unit configured to generate a signal used for controlling the DC motor by a pulse width modulation control based on the control value instructed by the control unit.

6. An image forming apparatus comprising the motor control apparatus according to claim 1,
    wherein the driven member includes one of a photosensitive drum and an intermediate transfer belt used for forming an image on a sheet.

7. The image forming apparatus according to claim 6, wherein the first detection unit includes an encoder configured to detect an angular velocity of a drive shaft of the photosensitive drum or the intermediate transfer belt.

8. The motor control apparatus according to claim 1, wherein, in the feed forward control during start-up of the DC motor, the control unit increases the control value from the first control value to the second control value corresponding to an angular velocity higher than the target angular velocity by a constant ratio, changes the feed forward control to the feedback control when the detection result by the first detection unit reaches the target angular velocity during the feed forward control.

9. The motor control apparatus according to claim 1, wherein the predetermined control value corresponding to a replaced driven member is a control value corresponding to a load of the replaced driven member.

* * * * *